United States Patent [19]

Marzec et al.

[11] Patent Number: 4,601,035

[45] Date of Patent: Jul. 15, 1986

[54] DATA COMMUNICATION METHOD AND CIRCUITRY

[75] Inventors: Richard P. Marzec, Lincroft; George W. Schramm, Oakhurst, both of N.J.; John B. Sharp, Denver, Colo.; David J. Stelte, Wheaton, Ill.; David M. Tutelman, Wayside, N.J.

[73] Assignees: AT&T Bell Laboratories; AT&T Information Systems, both of Murray Hill, N.J.

[21] Appl. No.: 538,158

[22] Filed: Oct. 3, 1983

[51] Int. Cl.$^4$ .................. G06F 11/00; G08C 25/00
[52] U.S. Cl. ..................... 371/32; 370/110.1
[58] Field of Search .............. 370/110.1, 110.4, 111; 371/32, 33; 375/10; 364/200, 900

[56] References Cited

U.S. PATENT DOCUMENTS

| | | | |
|---|---|---|---|
| 3,979,719 | 9/1976 | Tooley et al. | 371/32 |
| 4,432,090 | 2/1984 | da Silva | 371/32 |
| 4,439,859 | 3/1984 | Donnan | 371/32 |
| 4,507,782 | 3/1985 | Kunimasa et al. | 371/32 |
| 4,512,016 | 4/1985 | Fulcomer, Jr. et al. | 370/110.1 |
| 4,512,017 | 4/1985 | Nici et al. | 370/110.1 |

OTHER PUBLICATIONS

*Computer Design*, vol. 22, No. 3, Mar. 1983 (Winchester, Massachusetts, US) A. J. Weissberger: "Bit Oriented Data Link Controls", pp. 195-206.
*Computer Design*, vol. 22, No. 4, Apr. 1983 (Winchester, Massachusetts, US) A. J. Weissberger: "Bit Oriented Data Link Controls—Part II, pp. 137-140.
*Data Communications*, vol 12, No. 8, Aug. 1983 (New York, US) W. D. Brodd: "HDLC, ADCCP, and SDLC: What's the Difference?", pp. 115-122.
Internation Organization for Standardization, Document Reference No. ISO-6256-1981 (E) entitled "Data Communication—HDLC Balanced Class of Procedures", 1981.

*Primary Examiner*—Charles E. Atkinson
*Attorney, Agent, or Firm*—John A. Caccuro

[57] ABSTRACT

A data communication method and circuitry which uses a compatible subset of a standard high level data link control (HDLC) protocol to control link level communication between a digital terminal and a switch. The use of the subset of HDLC protocol reduces the complexity of the digital terminal design while maintaining communication compatibility with a switch which uses either the standard HDLC protocol or the subset of HDLC protocol.

12 Claims, 19 Drawing Figures

*FIG. 6*

| FORMAT | COMMANDS | | RESPONSES | | ENCODING | | | | | | | |
|---|---|---|---|---|---|---|---|---|---|---|---|---|
| | | | | | 1 | 2 | 3 | 4 | 5 | 6 | 7 | 8 |
| 601 INFORMATION TRANSFER | I | (INFORMATION) | | | 0 | N(S) | | | P | N(R) | | |
| 602 SUPERVISORY | RR | (RECEIVE READY) | RR | (RECEIVE READY) | 1 | 0 | 0 | 0 | P/F | N(R) | | | 604
| | RNR | (RECEIVE NOT READY) | RNR | (RECEIVE NOT READY) | 1 | 0 | 1 | 0 | P/F | N(R) | | | 605
| | REJ | (REJECT) | REJ | (REJECT) | 1 | 0 | 0 | 1 | P/F | N(R) | | | 606
| 603 UNNUMBERED | | | DM | (DISCONNECTED MODE) | 1 | 1 | 1 | 1 | F | 0 | 0 | 0 | 607
| | SABM | (SET ASYNCHRONOUS BALANCED MODE) | | | 1 | 1 | 1 | 1 | P | 1 | 0 | 0 | 608
| | DISC | (DISCONNECT) | | | 1 | 1 | 0 | 0 | P | 0 | 1 | 0 | 609
| | | | UA | (UNNUMBERED ACKNOWLEDGEMENT) | 1 | 1 | 0 | 0 | F | 1 | 1 | 0 | 610
| | | | FRMR | (FRAME REJECT) | 1 | 1 | 1 | 0 | F | 0 | 0 | 1 | 611

CONTROL 209

FIG. 9

STATE TABLE FOR TERMINAL (SWITCH USES SUBSET)

| STATE OF TERMINAL | RECEIVED SWITCH COMMANDS/RESPONSES 901 | | | TERMINAL SIGNAL CONDITIONS 902 | | | |
|---|---|---|---|---|---|---|---|
| | I,P 909 | RR,P | SABM 905 | LOCAL START COMMAND 903 | STATION BECOMES BUSY 906 | BUSY CONDITION CLEARS 911 | T1 EXPIRES | N2 EXCEEDED 913 |
| TS1 LINK SETUP REQUESTED | — | — | IIA→TS2 906 | — | — | — | DM | CANNOT SETUP LINK 914 |
| TS2 INFORMATION TRANSFER | RR,F 910 | I,P | UA | DM→TS1 904 | →TS3 | — | I,P | DM→TS1 916 |
| TS3 TERMINAL BUSY | — 912 | I,P | UA | DM→TS1 | — | →TS2 | I,P | DM→TS1 915 |

FIG. 10

STATE TABLE FOR SWITCH (SWITCH USES SUBSET)

| STATE OF SWITCH | RECEIVED TERMINAL COMMANDS/RESPONSES 1001 | | | SWITCH SIGNAL CONDITIONS 1002 | | | |
|---|---|---|---|---|---|---|---|
| | I,P 1009 | RR,F | UA 1005 | LOCAL START COMMAND 1008 | STATION BECOMES BUSY 1003 | BUSY CONDITION CLEARS 1011 | T1 EXPIRES 1007 | N2 EXCEEDED 1013 |
| SS1 LINK SETUP | — | — | →SS2 1006 | DM | SABM→SSI 1004 | — | SABM | CANNOT SETUP LINK 1014 |
| SS2 INFORMATION TRANSFER | RR,F 1010 | I,P | — | SABM→SSI | SABM→SSI | →SS3 | I,P | SABM→SSI 1016 |
| SS3 SWITCH BUSY | — 1012 | I,P | — | SABM→SSI | — | →SS2 | I,P | SABM→SSI 1015 |

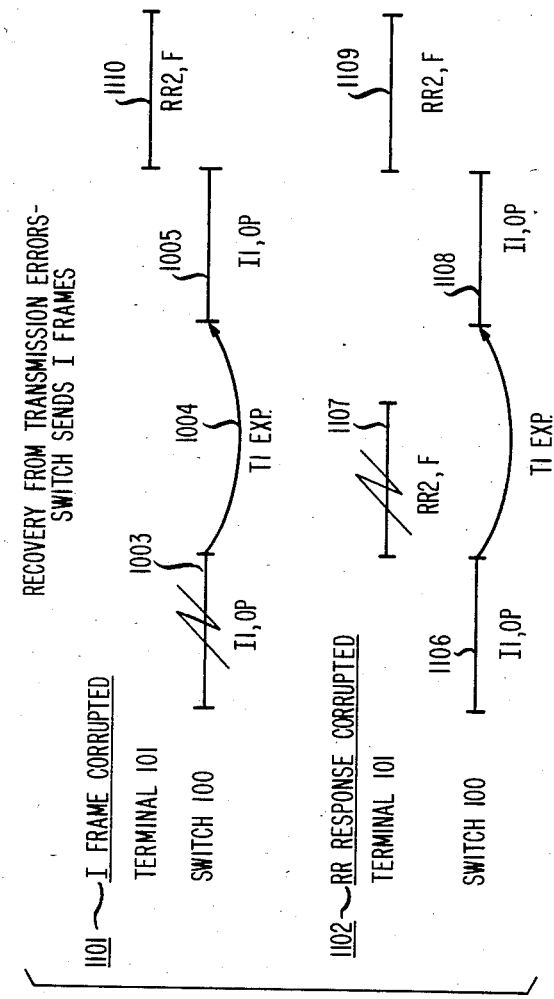

FIG. 14  STATE TABLE FOR SWITCH (SWITCH USES FULL SET)

| STATE OF SWITCH | I,P | RR,F | RR WITHOUT FINAL | UA WITHOUT FINAL | DM WITHOUT FINAL |
|---|---|---|---|---|---|
| FS1 DISCONNECTED | DM,F | — | — | — | SABM→FS2 |
| FS2 LINK SETUP | — | — | — | →FS5 | ↑FS1 |
| FS3 FRAME REJECTED | FRMR,F | — | — | — | SABM→FS2 |
| FS4 DISCONNECT REQUEST | — | — | — | →FS1 | ↑FS1 |
| FS5 INFORMATION TRANSFER | RR,F | — | — | SABM→FS2 | SABM→FS2 |
| FS6 REJ FRAME SENT | RR,F→FS5 | — | — | SABM→FS2 | SABM→FS2 |
| FS7 WAITING ACK | RR,F | →FS5 | W/O POLL | SABM→FS2 | SABM→FS2 |
| FS8 STATION BUSY | RNR,F | — | — | SABM→FS2 | SABM→FS2 |
| FS9 WAITING ACK AND STATION BUSY | RNR,F | →FS8 | W/O POLL | SABM→FS2 | SABM→FS2 |
| FS10 REJ SENT AND STATION BUSY | RNR,F | — | — | SABM→FS2 | SABM→FS2 |

RECEIVED TERMINAL COMMANDS/RESPONSES 1401

FIG. 13

| FIG. 14 | FIG. 15 |
|---|---|

FIG. 15

STATE TABLE FOR SWITCH (SWITCH USES FULL SET)

—— SWITCH SIGNAL CONDITIONS ——

| LOCAL START COMMAND | LOCAL STOP COMMAND | SWITCH BECOMES BUSY | BUSY CONDITION CLEARS | T1 EXPIRES | T2 EXPIRES | N2 EXCEEDED | INVALID N(S) RECEIVED | INVALID N(R) RECEIVED | FRAME RECEIVED | IDLE LINK RECEIVED | STATE OF SWITCH |
|---|---|---|---|---|---|---|---|---|---|---|---|
| SABM→FS2 1501 | — | — | — | SABM→FS2 1502 | — | — | — | — | — | — | FS1 DISCONNECTED |
| — | DISC→FS4 | — | — | SABM | SABM | NO LINK SETUP 1503 | — | — | — | →FS1 | FS2 LINK SETUP |
| SABM→FS2 | DISC→FS4 | — | — | FRMR | FRMR | SABM→FS2 1505 | — | — | — | →FS1 | FS3 FRAME REJECTED |
| SABM→FS2 | — | — | — | DISC | DISC | FS1 | — | — | — | →FS1 | FS4 DISC REQUESTED |
| SABM→FS2 | DISC→FS4 | RNR→FS8 | — | RR,F→FS7 | RR,F→FS7 | SABM→FS2 | REJ,F→FS6 | FRMR→FS3 | FRMR→FS3 | →FS1 | FS5 INFO TRANSFER |
| SABM→FS2 | DISC→FS4 | RNR→FS10 | — | REJ,F→FS7 | REJ,F→FS7 | SABM→FS2 | — | FRMR→FS3 | FRMR→FS3 | →FS1 | FS6 REJ FRAME SENT |
| SABM→FS2 | DISC→FS4 | RNR→FS9 | — | RR,F | — | SABM→FS2 | — | FRMR→FS3 | FRMR→FS3 | →FS1 | FS7 WAITING ACK |
| SABM→FS2 | DISC→FS4 | — | RR→FS5 W/O | RNR,P→FS9 | RNR,P→FS9 | SABM→FS2 | RNR,F | FRMR→FS3 | FRMR→FS3 | →FS1 | FS8 STATION BUSY |
| SABM→FS2 | DISC→FS4 | — | RR→FS7 W/O | RNR,P | — | SABM→FS2 | — | FRMR→FS3 | FRMR→FS3 | →FS1 | FS9 WAITING ACK & STA. BUSY |
| SABM→FS2 | DISC→FS4 | — | RR→FS6 W/O | RNR,P→FS9 | RNR,P→FS9 | SABM→FS2 | RNR,F | FRMR→FS3 | FRMR→FS3 | →FS1 | FS10 REJ SENT & STA. BUSY |

1504

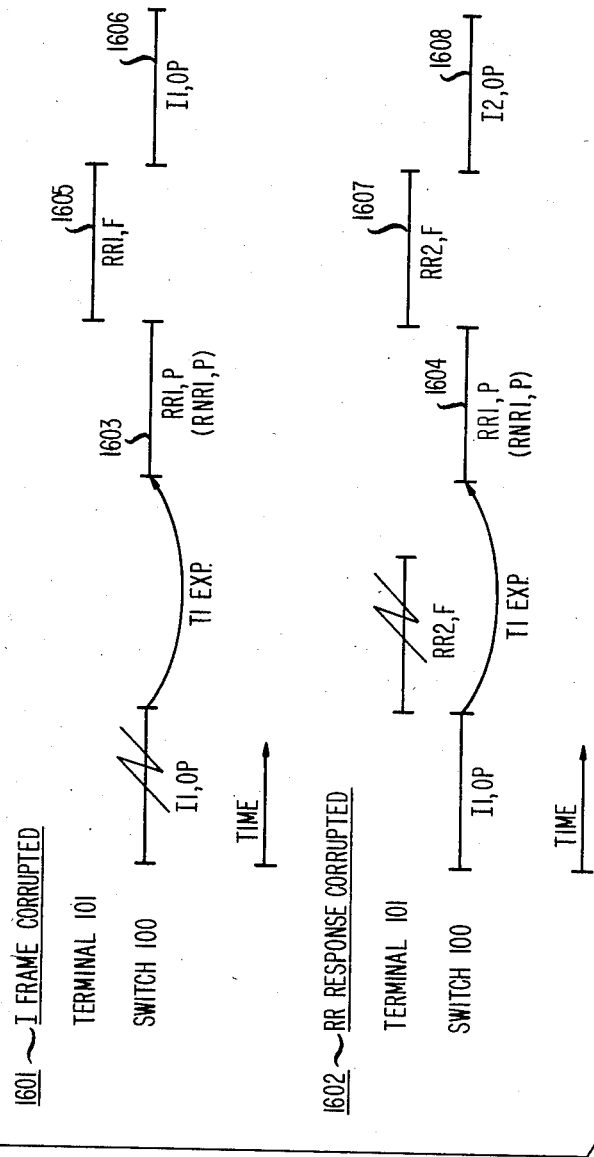

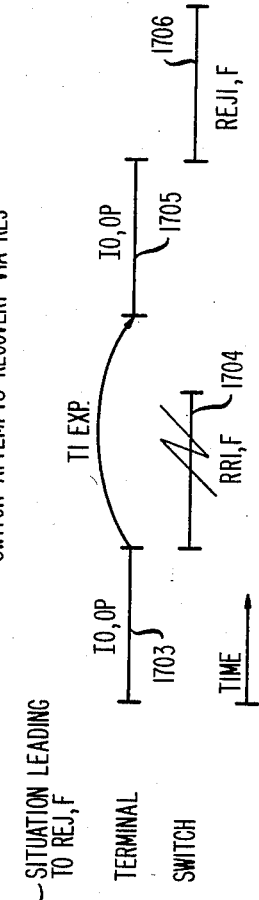
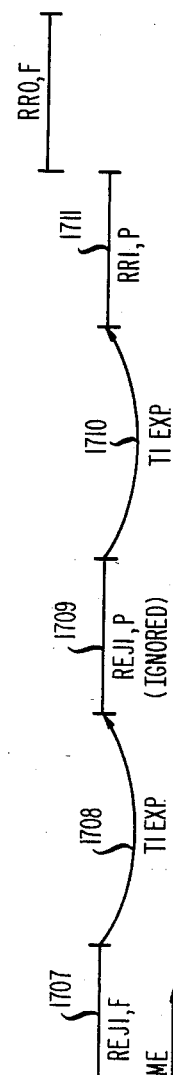
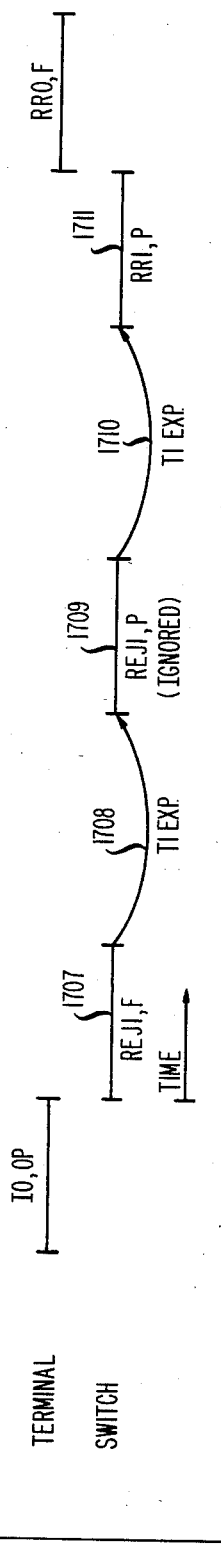
FIG. 17

FIG. 18     DEFINITION OF STATES

DISCONNECTED
THE SWITCH ENTERS THIS STATE AFTER HAVING BEEN INSTRUCTED TO DISCONTINUE OPERATION BY EITHER THE REMOTE TERMINAL OR A HIGHER LEVEL PROTOCOL.

LINK SETUP
SWITCH ENTERS THIS STATE AFTER SENDING SABM.

LINK SETUP REQUESTED
TERMINAL ENTERS THIS STATE AFTER SENDING AN UNSOLICITED DM.

FRAME REJECTED
SWITCH ENTERS THIS STATE AFTER SENDING FRMR.

DISCONNECTED REQUEST
SWITCH ENTERS THIS STATE AFTER SENDING DISC.

INFORMATION TRANSFER
THIS STATE IS ENTERED AFTER LINK INITIALIZATION AND IF NO ERRORS OR SPECIAL REQUESTS ARE CURRENTLY AFFECTING THE PROTOCOL. BOTH STATIONS MAY EXCHANGED DATA FREELY.

REJ FRAME SET
SWITCH ENTERS THIS AFTER SENDING A REJ RESPONSE TO AN OUT OF SEQUENCE I FRAME.

WAITING ACK
SWITCH ENTERS THIS IF IT HAS NOT RECEIVED ACKNOWLEDGEMENT OF A PREVIOUSLY TRANSMITTED SUPERVISORY COMMAND FRAME WITH POLL.

STATION BUSY
A STATION ENTERS THIS IF IT CANNOT HANDLE ANY DATA FRAMES AT THE PRESENT TIME.

WAITING ACK AND STATION BUSY
A COMBINATION OF THESE STATES (FOR SWITCH ONLY)

REJ SEND AND STATION BUSY
A COMBINATION OF THESE STATES (FOR SWITCH ONLY)

FIG. 19     STATE TABLE NOTATIONS

XXX→Sn    STATIONS SEND FRAME XXX AND THEN PROCEEDS TO STATE n.

→Sn    STATION PROCEEDS TO STATE n.

—    INDICATES EITHER "CANNOT OCCUR" OR "NO RESPONSE" OR "NO CHANGE IN STATE."

,P    INDICATES A COMMAND FRAME WITH POLL BIT SET.

,F    INDICATES A RESPONSE FRAME WITH FINAL BIT SET.

(WITH NO ,F OR,P)    WITH NO COMMA AND P/F BIT IT SHOULD BE CLEAR FROM CONTEXT WHETHER P/F BIT SET. SOMETIMES MAY BE USER SPECIFIED.

TI    MAXIMUM TIME ALLOWED BETWEEN THE TRANSMISSION OF FRAMES (REQUIRING AN ANSWER) AND THE RECEPTION OF THE FRAME RETURNED AS AN ANSWER.

T2    TIME INTERVAL FOR PERIODICALLY QUERYING THE STATUS OF A REMOTE STATION.

N2    MAXIMUM NUMBER OF TIMES THAT TIMER TI CAN RUN OUT BEFORE LINK RESET IS INITIATED.

DATA COMMUNICATION METHOD AND CIRCUITRY

TECHNICAL FIELD

This invention relates to data communications utilizing the CCITT X.25 protocol or equivalent protocols and more particularly to a data communications method and circuitry using a compatible subset of the high level data link control (HDLC) level of the X.25 protocol.

BACKGROUND OF THE INVENTION

The increasing interaction between data communication equipment having varying communication characteristics has led to the adoption of standard protocols, such as the CCITT X.25, to facilitate compatible communications. Typically, these standard protocols are divided into a hierarchical set of levels or layers. The layering aspect of a protocol implementation separates communication functions into distinct protocol levels to enable communications between equivalent levels of equipment at each end of a facility.

One level of the X.25 protocol, called the high level data link control HDLC provides data link control which involves functions such as link initialization, the detection and recovery from errors in the transmission of numbered blocks of digital data, and data flow control to ensure that blocks of data are not being sent by one terminal faster than it can be received by the other terminal. The HDLC line link protocol specifies a repertoire of commands and responses to provide these data link control functions. Because of the variety of commands/responses and the resulting number of states in which the connected communication equipment can operate, the equipment requires sophisticated controllers to control link level communications.

In certain telephone applications, there is a need for line powered communication equipment or terminals which do not require the sophisticated communications capability provided by the standard HDLC protocol but which, nevertheless, require that communications be compatible with the standard HDLC protocol.

SUMMARY OF THE INVENTION

In accordance with the present invention, a uniquely defined compatible subset of the standard HDLC protocol is used to control the data link communications. In the present invention the standard HDLC receiver ready response, RR, is redefined and utilized to acknowledge both a received correctly numbered data transmission and a received incorrectly numbered data transmission. The RR response includes an identification of the last received correctly numbered data transmission. The redefined RR response incorporates the system performance improvements associated with the use of the optional HDLC reject response (REJ) without including the REJ response as part of the subset.

Moreover, by limiting to one the number of unacknowledged data transmissions (I frames) the transmitting terminal can utilize the RR response to determine if the incorrectly numbered data transmission (i.e., I frame with send sequence error N(s)) is the result of a transmission error or a system (e.g., software) error. Additionally, by limiting the capability of the terminal and by utilizing additional capabilities of the standard HDLC protocol, additional station commands/responses are eliminated while maintaining the terminal compatibility with standard HDLC protocol operated equipment. Finally, by coordinating these modifications at the transmitter and receiver terminals, a uniquely defined compatible subset of the standard HDLC protocol is utilized to simplify the controllers required at both the transmitter and receiver terminals.

BRIEF DESCRIPTION OF THE DRAWING

The detailed description of the invention will be more fully appreciated from the illustrative embodiment shown in the drawing, in which:

FIG. 5 illustrates the prior art supervisory (S) channel HDLC protocol commands/responses used for data link control;

FIG. 6 shows the data format of the control byte of the S bit frame which define the commands and responses of the HDLC protocol;

FIG. 9 shows the state table for the terminal of FIG. 8;

FIG. 10 shows the state table for the switch of FIG. 8;

FIG. 11 shows the transmission error recovery sequence for both the switch and terminal of FIG. 8;

FIG. 12 shows the state table for the terminal of FIG. 7;

FIG. 13 shows the relationship of FIGS. 14 and 15;

FIG. 14 shows a first part of the state table for the switch of FIG. 7;

FIG. 15 shows a second part of the state table for the switch of FIG. 7;

FIG. 16 shows the transmission error recovery sequence for the switch of FIG. 7;

FIG. 17 shows the transmission error recovery sequence for the terminal of FIG. 7;

FIG. 18 defines the states shown in the various state tables; and

FIG. 19 defines the various notations utilized in the state tables.

DETAILED DESCRIPTION

Hardware

Figure 1:
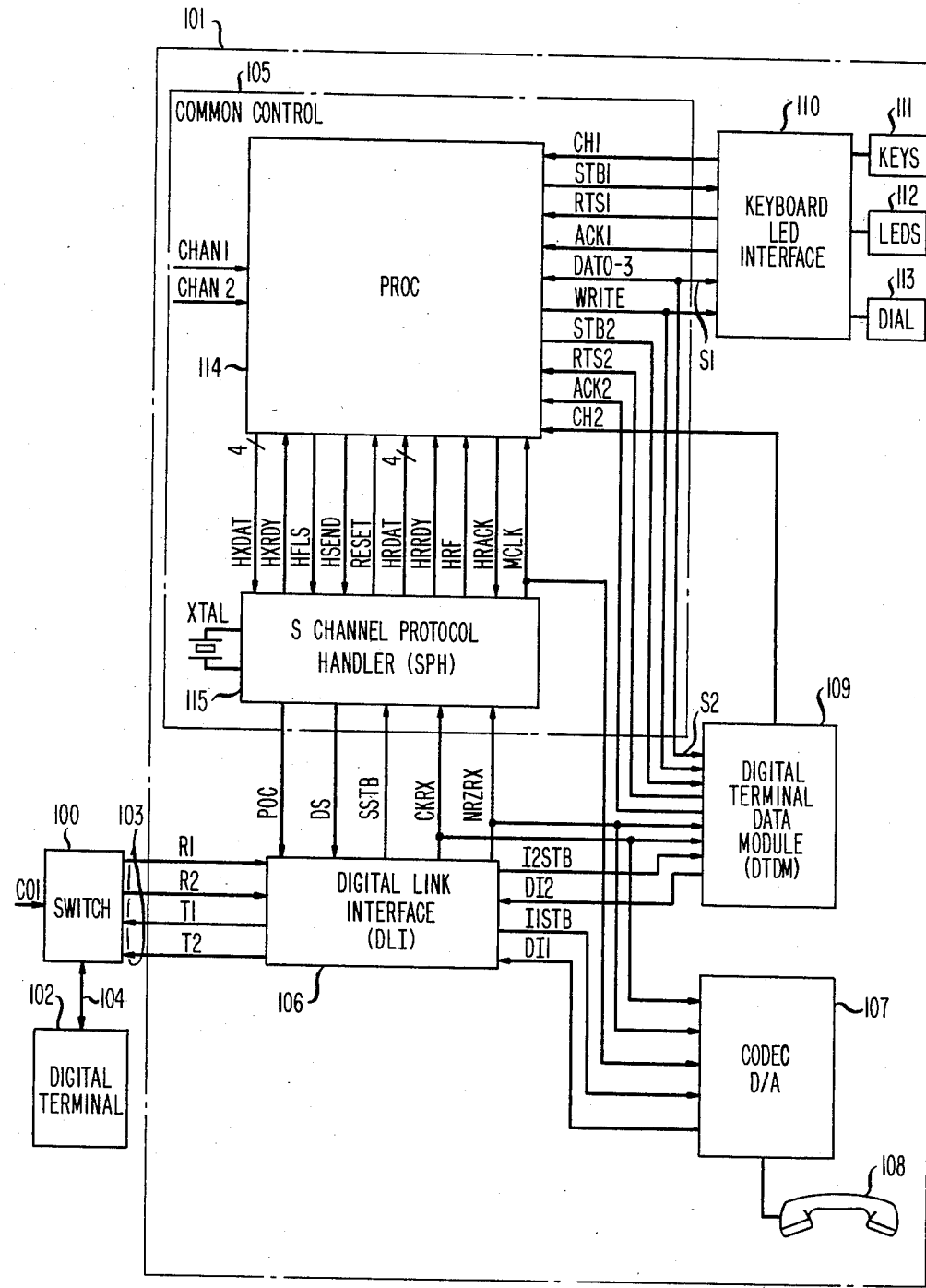
FIG. 1 is a block diagram of a communication system including a digital switch and two digital terminals.

FIG. 1 shows an embodiment of a communication system incorporating the present invention. The system of FIG. 1 includes a central office line CO1 and one or more multi-functional digital station sets (or terminals) 101 and 102 connected over a four-wire communication facility 103 and 104, respectively, to PBX or switch 100.

Other aspects of the communication system of FIG. 1 are described in the patent application of Fulcomer et al, Ser. No. 464,057, filed on Feb. 4, 1983, now U.S. Pat. No. 4,512,016 issued Apr. 16, 1985.

The system of FIG. 1 controls the simultaneous voice and data transmission between station sets 101 and 102 and/or central office line CO1. Communications between PBX 100 and station set 101 occur over a 4-wire full duplex serial data facility (link) 103. Communications occur at a 160 Kilobit/sec (160 Kb/s) rate using a well-known alternate bipolar pulse (ABP) signal to represent the logic 1s and 0s of the digital data. In another embodiment facility 103 can provide phantom power from PBX 100, in a well-known manner, to power station set 101.

Figure 2:
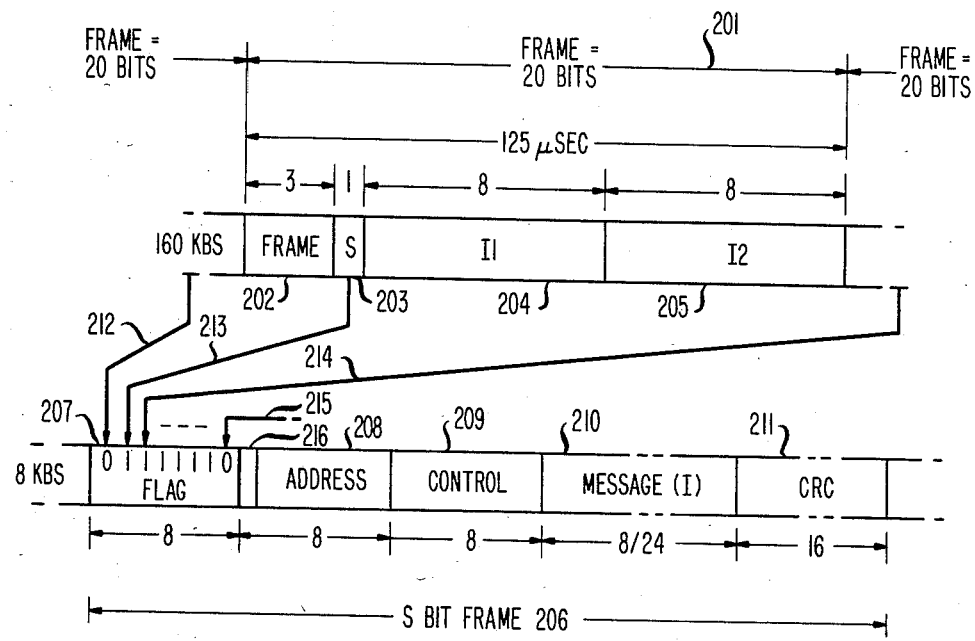
FIG. 2 illustrates the data frame format and the S bit frame format utilized, respectively, for the data and S channel data transmissions between the digital switch and the digital terminals.

The frame format of the 160 Kb/s digital data is shown in FIG. 2. The digital data may be formatted into a 20 bit frame, 201, including 3 framing bits, 202, a supervisory (S) bit, 203, and two 8 bit information fields, (I1 and I2) 204 and 205. Since each frame has 20 bits and the bit rate of the facility is 160 Kb/s, the frame rate is 8 Kb/s. Since each information field or channel I1 or I2 has 8 bits per frame each I field provides a 64 Kb/s data channel. In one embodiment the I1 field contains digital voice information and the I2 field contains data.

Returning to FIG. 1, an embodiment of a station set 101 is shown as including common control 105, digital link interface (DLI) 106, codec 107, handset 108, digital terminal data module (DTDM) 109, keyboard and LED interface 110, keys 111, LEDS 112 and dial 113.

The DLI (106) can be a custom hybrid integrated circuit (HIC) design that functions as a modulator-demodulator for converting binary data signals from station set 101 into the alternate bipolar (ABP) signals which are communicated over facility 103. The DLI, 106, is coupled to facility 103 using transformers, not shown. The DLI, 106, also multiplexes-demultiplexes the S-channel, I1 channel and I2 channel to form the frame format shown in 201 of FIG. 2.

When ABP signals are received over leads R1/R2 of facility 103, DLI 106 amplifies and shapes the ABP signal to remove distortion, converts the data to a non-return to zero format (NRZ), and extracts clock and framing information. The DLI 106 outputs the data serially over lead NRZRX with the appropriate clock signal on lead CKRX to the S-channel protocol handler (SPH) 115, digital terminal data module (DTDM) 109 and codec 107.

The SPH 115, codec 107 and DTDM 109 extract, respectively, S, I1 and I2 from the data on lead NRZRX. Strobe SSTB is high to SPH 115 when the S-channel data is present on lead NRZRX. Note, the DLI 106 receives data from SPH 115 over lead DS in response to a strobe signal on lead SSTB. Strobe I1STB is high when the I1 channel data for codec 107 is present on lead NRZRX. Note, during strobe I1STB, in synchronism with the I1 channel data being received by codec 107, data from codec 107 is being transmitted to DLI 106 over lead DI1. Similarly, during strobe I2STB, I2 channel data is received by DTDM 109, in synchronism with the data being transmitted by DTDM 109 over lead DI2 to DLI 106.

The received data (S, I1, I2), clock and framing information are converted by DLI 106 from the NRZ format to ABP format and multiplexed together into frame format 201 for transmission over leads T1/T2 of facility 103. Lead POC to DLI 106 from SPH 115 provides a power-on/clear signal to reset DLI 106.

Common control 105 includes a 4 bit microprocessor PROC 114 and SPH 115. The SPH 115 may be a custom complementary metal oxide semiconductor (CMOS) large scale integrated (LSI) circuit that receives serial S-channel data bits over lead NRZRX and converts them to a 4 bit parallel data for output to PROC 114 over 4 lead bus HRDAT. The SPH 115 signals PROC 114 on lead HRRDY that data is available and awaits an acknowledge signal HRACK from PROC 114. Thereafter, SPH 115 generates a flag HRF to signal when the data on bus HRDAT is ready. The SPH 115 provides an effective buffer between the DLI 106 and PROC 114. The SPH 115 uses crystal XTAL to generate a master clock signal MCLK which is used by PROC 114 and codec 107. The SPH 115 also provides a resistor/capacitor circuit for providing a power-on/clear signal, POC, for DLI 106 and a reset signal RESET for PROC 114. When data is to be transmitted from PROC 114 to SPH 115 a signal HXRDY inquires if data is available for transmission from PROC 114. When data is ready PROC 114 generates signal HSEND and then outputs 4 bits of parallel data on bus HXDAT with an associated flag HFLS. The SPH 115 may also provide a sanity timer for PROC 114 and other circuits, as well as provide the necessary signal to drive a station set ringer (not shown).

Processor (PROC) 114 includes read-only-memory (ROM), not shown, which has been programmed to interpret and support the disclosed subset of the high level data link control (HDLC) protocol. For a background discussion of HDLC, reference is made to International Standard Organization (ISO), Document ISO/DIS 6256, entitled "Data Communication—HDLC Balanced Class of Procedure".

Basically, the HDLC protocol provides link (i.e., facility 103) control which provides an essentially error-free, transparent transmission facility that ensures that data is delivered between PBX 100 and station set 101. As shown in FIG. 2, the S-channel data frame 206 is comprised of the S-bits (212, 213, 214 through 215) from adjacent data frames. This S-channel data frame 206 is arranged in the standard HDLC format including an 8 bit flag 207; an 8 bit address word 208; an 8 bit control word 209; a message field I which is not restricted in format, length (typically 8 bits to 24 bits long), or content 210; and a 16 bit cyclic redundancy code (CRC) 211. Later paragraphs will provide a description of the disclosed inventive apparatus and method of using a limited subset of HDLC to provide link (i.e., facility 103) control. Basically, processor 114 communicates with PBX 100 using the HDLC command subset for establishing a link, maintaining link protocol while the link is up, providing the proper interface to keyboard/LED interface 110, and taking down the link.

Upon receiving a S-bit frame 206 of data from PBX 100, processor 114 checks the CRC bits, 211, to make sure there are no transmission errors. Data message (I) 210 includes such information as ringer on, off-hook, on-hook, light LED, etc. If there are no errors in the S bit frame 206, then the signal channel bit, 216, of the address byte 208, is checked to determine which of the two logical signaling channels is to receive message (I) 210. A signal channel bit 216 that is logic 0 indicates the message (I) 210 which is outputted on leads DAT0-3 is for keyboard/LED interface 110, while a logic 1 indicates the message (I) 210 is for DTDM 109. Data to keyboard/LED interface 110 is S1 and is outputted on leads DAT0-3 with a WRITE and a strobe STB1 signal. Data to DTDM 109 is S2 and is outputted on leads DAT0-3 with a write WR and a strobe STB2 signal. Processor 114, keyboard 110 and DTDM 109 utilize well-known tri-state buffers to drive and share data bus DAT0-3.

The control byte 209 of FIG. 2 is examined by processor 114 to determine the type of S bit frame 206 that has been received. The bit format of the control byte 209 is shown in FIG. 6 and represents the various commands and responses of the HDLC protocol. If a valid information I frame, 601, is received, the message (I) byte (or bytes) 210 is transferred to be decoded and outputted by keyboard/LED interface 110. Note, the content of this message byte (I) is not decoded by PROC 117. If either CRC bits 211, Address byte 208, or Control byte 209 are invalid, processor 114 ignores the S-bit frame 206 and sends no response to PBX 100. If an I frame 601 is sent with no message bytes (null I) 210, processor 114 acknowledges the frame by sending a RR response 604 to PBX (switch) 100. Keyboard/LED interface 110, however, does not output the data from any invalid frames or null I frames. The following section describes the handshaking protocol used when transferring I frame data messages, 210, from the PROC 114 to keyboard/LED interface 110 and DTDM 109 over leads DAT0-3 (via S1 and S2, respectively).

The message bytes, 210, of an I frame are exchanged between the processor 114 and DTDM 109 or interface 110 as a sequence of nibbles (4 bits of data) over the 4 bit data bus DAT0-3 when lead WRITE is logic 1. The adopted convention is to transmit the low nibble first. As noted, both logical channels, S1 and S2, use the same 4 bit data bus and are distinguished by the strobing of STB1 or STB2. The interface 110 and DTDM 109 output acknowledge signals ACK1 and ACK2, respectively, signaling a data reception to processor 114. Once a data transfer from the processor 114 to interface 109 or DTDM 110 on either S-channel (S1 or S2) has begun, processor 114 remains dedicated to the data transfer until completion. Only after the termination of the data transfer on one channel can the other channel be activated.

Figure 3:
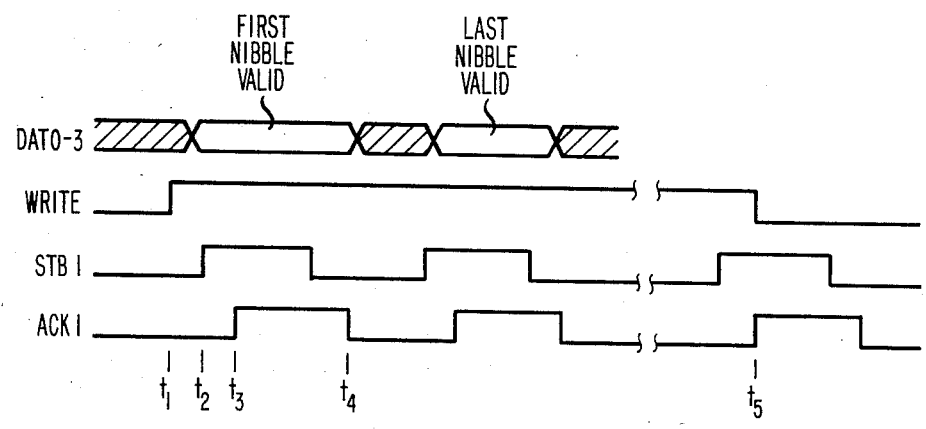
FIG. 3 shows the timing diagram of a data transfer from the processor unit to the keyboard/LED interface of FIG. 1.

With reference to FIG. 3, a typical data transfer from processor 114 to keyboard/LED interface 110 is illustrated. When processor 114 has a block of data to send to keyboard/LED interface (110), it raises the WRITE lead at time t1 and places the data on the bus DAT0-3. The STB1 signal is raised at time t2. The interface 110 seeing the active WRITE signal when STB1 is raised, recognizes that the direction of the information exchange is from processor 114 to interface 110. After interface 110 inputs the nibble, it raises the ACK1 signal, at time t3, indicating to processor 114 that the lower nibble of the first byte has been accepted. Processor 114 then lowers STB1 and interface 110 is expected to respond by lowering ACK1. Subsequent nibbles are then transferred by this STB1-ACK1 handshaking. On the last nibble of an information exchange, processor 114 lowers the WRITE signal at time t5 before lowering STB1 at time t6. The interface 110, seeing the WRITE signal low when STB1 is lowered, recognizes this to be the last nibble of the exchange. Note, a data transfer from processor 114 to DTDM 109 operates in a similar manner using strobe signal STB2 and acknowledge signal ACK2.

Figure 4:
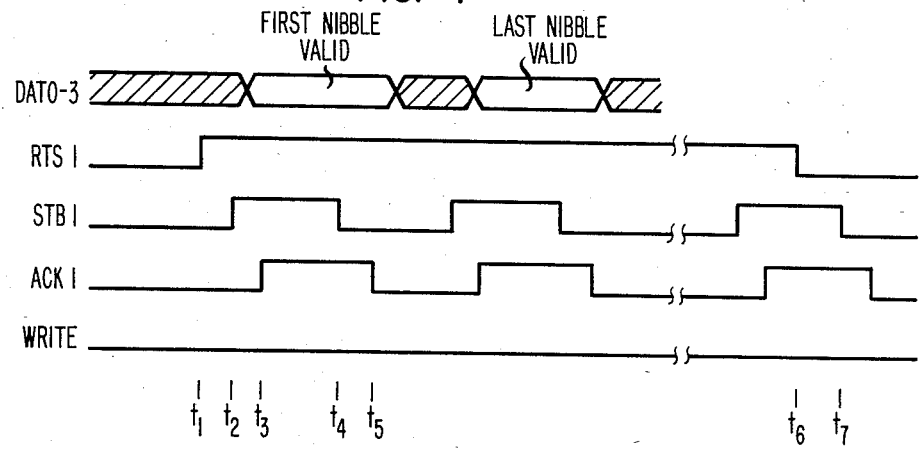
FIG. 4 shows the timing diagram of a data transfer from the keyboard/LED interface to the processor unit of FIG. 1.

For information transfer from processor 114, the WRITE lead serves a dual purpose: it denotes the direction of the exchange and it specifies the end of the exchange. When STB1 goes high, interface 110 polls the WRITE lead first. If WRITE is high, then the information transfer is as described previously. If WRITE is low, then RTS must be polled. If RTS1 is high, as shown in FIG. 4, then interface 110 should initiate information transfer to processor 114 (described in next paragraph). If RTS1 is low, then the STB1 signal should be ignored and the ACK1 signal should be lowered if it is high. The situation of STB1 going high when both RTS1 and WRITE are low will occur during power up or sanity timeout of processor 114 and are used to generate power up signal POC of FIG. 1.

When processor 114 receives an I data message 210 from interface 110, it appends the proper Address 208, Control 209, and CRC 211 bytes. The resulting frame 206 is then sent to PBX 100 via facility 103. The following section makes reference to FIG. 4 to describe a typical handshaking protocol used when transferring I frame data messages 210 from interace 110 to processor 114 over channel S1. In a similar manner, data messages 210 are transferred over channel S2 to processor 114 from DTDM 109.

The data messages 210 are sent by interface 110 to processor 114 in the same manner that processor 114 sends them to interface 110. Nibbles are sent with the low nibble first on the same data bus DAT0-3. As shown in FIG. 4, interface 110 requests to send a block of I messages to processor 114 by a logic 1 on the RTS1 lead at time t1. Within a reasonable amount of time, at time t2, processor 114 responds by raising STB1. At this point the interface 110 responds by checking WRITE and RTS1. In this case WRITE is low and RTS1 is high. The interface 110 places the lower nibble of the first byte of data onto the bus DAT0-3 and then raises ACK1 at time t3. Processor 114 inputs the nibble and lowers STB1 at time t4. Interface 110 responds by lowering ACK1 at time t5. This procedure is repeated until the local interface reaches the last nibble to be transferred. At this point interface 110 indicates to processor 114 that the last nibble has been exchanged by lowering RTS1 at time t6 prior to lowering ACK1 at time t7. Processor 114, seeing that RTS1 has been lowered before the falling edge of ACK1, recognizes this as the final nibble of the exchange. Note that as in the case of message 210 transfer from processor 114 to interface 110, processor 114 remains dedicated to this data transfer once it raises STB1. It is important also to note that the interface 110 should never raise RTS1 unless valid data is to be transferred. If interface 110 sends only one nibble to processor 114, processor 114 will then proceed to bring the link (facility 103) down. The interface 110 and DTDM 109 also provide a device connected signal CH1 and CH2, respectively, to processor 114. These signals must be at logic 1 when terminal 101 includes the respective device (interface 110 or DTDM 109) and logic 0 when terminal 101 does not include the respective device.

As noted, processor 114 is responsible for bringing the link (facility 103) up, satisfying link protocol while the link is up, providing the proper interface between the interface 110 and DTDM 109 and PBX 100, and, when necessary, for bringing the link down. As noted, processor 114 communicates with PBX 100 via a novel subset of the HDLC commands/responses which is transmitted as part of the control byte of S-channel data frame shown in FIG. 2.

The format of the S-channel frame 206 is shown in FIG. 2. Each S-channel frame is always separated by at least one S-channel flag 207 (7E in hexidecimal code). These flags are removed by SPH, 115, from frames entering terminal 101 from the link or facility 103 and inserted by SPH 115 for frames sent out to facility 103 by terminal 101. With reference to FIG. 6, the prior art HDLC link protocol, as described in the previously referenced ISO document ISO/DIS 6256, utilizes all the commands and responses shown for supervising information transfer between data devices.

Communication Format—General Description

As shown in FIG. 5, communications between data devices (such as PBX 100 (hereinafter switch 100) and terminal 101) typically utilized the prior art standard HDLC protocol. In such an arrangement switch 100 and terminal 101 communication required commands I, RR, RNR, REJ, SABM, and DISC and responses RR, RNR, REJ, DM, UA and FRMR. As previously noted, there are communication applications where the standard HDLC link protocol of FIG. 5 may be too sophisticated to be practical for a particular application.

Figure 7:
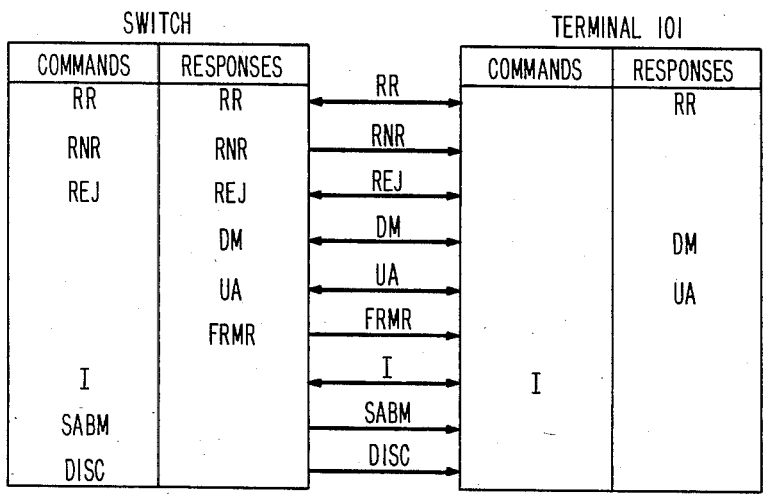
FIG. 7 shows in accordance with the present invention a terminal utilizing the compatible subset of the standard HDLC protocol to control data link communications with a switch utilizing the complete HDLC protocol.

FIG. 7 illustrates the present invention for controlling communications between switch 100 and terminal 101 utilizing a unique subset of commands and responses which are made compatible with the standard HDLC protocol by placing certain limitations on data transmission and by changing the definition of certain commands. Note as shown in FIG. 7, that terminal 101 using the disclosed subset of HDLC protocol can still communicate with switch 100 which uses the standard HDLC protocol. Shown in FIG. 7 is one embodiment of a communication system according to the present invention where switch 100 which uses the standard HDLC protocol, communicates with terminal 101 which uses the disclosed subset of the HDLC protocol. By comparison with FIG. 5, switch 100 of FIG. 7 uses the same repertoire of commands and responses, while terminal 101 only utilizes command I and responses RR, UA and DM.

Figure 8:
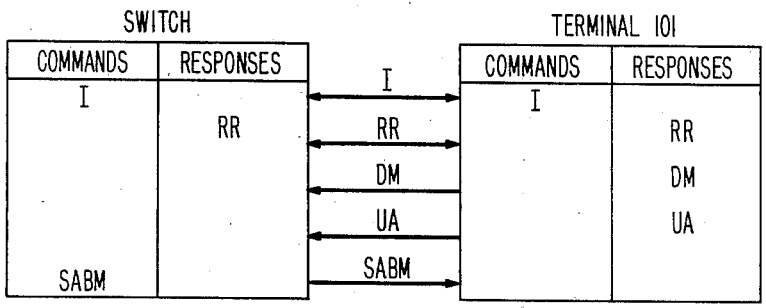
FIG. 8 shows in accordance with the present invention a terminal and switch each utilizing a subset of the standard HDLC protocol to control data link communication therebetween.

Shown in FIG. 8 is another system embodiment of the present invention which switch 100 as well as terminal 101 utilize a subset of commands/responses. Switch 100 utilizes commands I and SABM and response RR. Terminal 101 utilizes command I and responses RR, UA and DM.

The following paragraphs describe the present inventive HDLC protocol subset as utilized in terminal 101 which can communicate with either a switch which uses the standard HDLC protocol (FIG. 7) or a switch which uses the disclosed HDLC protocol subset (FIG. 8). It should be noted that the application of the disclosed protocol subset is not limited to a switch/terminal arrangement but can be utilized to control communications between any two data communication devices.

As shown in FIG. 6, the information contained in the standard HDLC control field 209 is grouped into three formats. The information transfer format 601 includes only information command (I) which has bit 1 equal to 0 of control word 209. The I command is used to transfer sequentially numbered (N(S), N(R)) messages using the I message field 210 of FIG. 2. The function of variables N(S), N(R), and P/F of control word 209 are independent and will be described more fully in a later paragraph.

The supervisory format 602 is identified by bit 1 equal to 1 and bit 2 equal to 0 in control word 209 and is used to perform link supervision control functions such as acknowledgement of I frames (RR), request retransmission of I frames (REJ), and to request a temporary suspension of transmission of I frames (RNR). The supervisory format includes as commands and responses receive ready (RR) 604, receive not ready (RNR) 605, and reject (REJ) 606.

The unnumbered format is identified by bits 1 and 2 equal 1 in control word 209. The standard unnumbered commands include set asynchronous balance mode (SABM) 608, and disconnect link (DISC) 609. The standard unnumbered responses include disconnect mode (DM) 607, unnumbered acknowledgement (UA) 610, and frame reject (FRMR) 611.

HDLC Subset at Switch and Terminal

Using the present invention a redefined subset of the HDLC protocol commands and responses shown in FIG. 5 are utilized to control data communications between two data devices. More particularly, with reference to FIG. 8 communications between switch 100 and terminal 101 will be described using the novel subset of HDLC protocol commands and responses of FIG. 8.

The subset of the standard HDLC commands and responses utilized in the present invention, as shown in FIG. 8, can be divided into those that switch 100 sends to terminal 101 and those that terminal 101 sends to switch 100. The standard HDLC definitions of these commands and responses are described in the following paragraphs. The modifications to these standard definitions as required by the present invention will be described in later paragraphs.

Switch to Terminal Messages

Set Asynchronous Balanced Mode (SABM) Command

The SABM command is generated by switch 100 to initialize or reset the signaling link protocol. No information I field (210 of FIG. 2) is permitted with the SABM command. The terminal acknowledges this command by returning a UA response. It also resets its send N(S) and receive N(R) variables to zero.

Previously transmitted information messages that are unacknowledged when this command is invoked remain unacknowledged. The SABM command will always be sent with its poll bit (P) set to one.

Information (I) Command

The information command is used to transfer sequentially numbered data transmissions or user messages between switch 100 and terminal 101 (e.g., various status and control signals). The control field for the I message contains a Send Sequence Number, N(S), which indicates the sequence number associated with the transmitted I message, and a Receive Sequence Number, N(R), which indicates the expected sequence number of the next received I message. These are described in more detail in the message sequencing section. The information command will always be sent with its Poll bit (P) set to one.

Receive Ready (RR) Response

The Receive Ready is used to acknowledge the previously received I message and to indicate that it is ready to receive another I message. No information field is permitted with the RR response. A Receive Sequence Number, N(R), is transmitted with the RR to indicate the expected send sequence number N(S) of the next received I message. All received I messages must be acknowledged with an RR. Switch 100 will always send the Receive Ready with its Final bit (F) set to one.

Terminal to Switch Messages

Disconnected Mode (DM) Response

The Disconnected Mode is used as a message from terminal 101 to request link initialization. Switch 100 must respond to a DM with a SABM message. An information field is not permitted with the DM message. The DM response will always be sent with its Final bit set to zero.

Unnumbered Acknowledge (UA) Response

The Unnumbered Acknowledge response is used to acknowledge the receipt of a SABM from switch 100. No information field is permitted with the UA response. For compatibility with a full HDLC PBX 100, the terminal 101 will set the Final bit (F) in their UA response high or low (i.e., logic 1 or logic 0) depending on the Poll bit (P) in the SABM message being acknowledged. If the SABM message was sent with its Poll bit (P) set to one, the UA sent by the terminal will have its Final bit (F) set to one; if the SABM message was sent with its Poll bit (P) zero, the UA will have its Final bit (F) zero.

Information (I) Command

The information command is the same as from switch 100 to the terminal 101, for passing user messages. The information command will always be sent with its Poll bit (P) set to one.

Receive Ready (RR) Response

The receive ready is used in the same manner as from switch 100 to terminal 101, to acknowledge received information messages. Like the UA message, terminal 101 sets the Final bit (F) in the RR response logic 1 or logic 0 depending on the Poll bit (P) in the information message being acknowledged. If the I message was sent with its Poll bit (P) set to one, the RR sent by terminal 101 will have its Final bit (F) set to one; if the I message was sent with its Poll bit (P) zero, the RR will have its Final bit (F) zero.

In one embodiment, since the I and SABM messages will always be sent with their Poll bits (P) equal to one, the RR and UA messages will likewise always have their Final bits (F) set to one.

Communication Format—Detailed Description

A. Switch (subset, FIG. 10)—Terminal (subset, FIG. 9)

As noted, the following description of the present invention uses the well known operation of the standard HDLC protocol as a starting point. The operations of the standard HDLC protocol are described in the previously-referenced ISO article and articles referenced therein. Only those descriptions of the operations of the standard HDLC protocol and modifications thereto which are necessary for the understanding of the present invention will be included herein.

The description of communications between switch 100 and terminal 101 using the protocol subset shown in FIG. 8, will reference the terminal state table shown in FIG. 9 and the switch state table shown in FIG. 10. In FIG. 9 the possible operating states of terminal 101 is shown by TS1, TS2 and TS3. The state of terminal 101 is responsive to received switch commands/responses 901 and local terminal signal conditions 902. Similarly, the state of switch 101 (i.e., SS1, SS2, SS3) is responsive to received terminal commands/responses 1001 and local switch signal conditions 1002. The present invention utilizes a subset of HDLC protocol by redefining and placing certain operating conditions on the commands and responses used by switch 100 and terminal 101. Note, in the following description the abbreviation X,Y means that command or message X has a bit Y at logic 1. Additionally, in the following description the word station refers to either switch 100 or terminal 101.

One operating condition permits only I frames (data transmission) with a poll bit (i.e., I,P where bit 5 of control field is logic 1 during information command (I), see FIG. 6). Using an I frame (I,P) limits to one the number of unacknowledged data transmissions. While not essential this condition, as we will discuss later, helps a station distinguish transmission errors from software insane errors. Another condition is that a station response to I frames with a RR response with final bit set (i.e., RR,F where bit 5 of control field is logic 1 during RR transmission, see FIG. 6). This condition follows the rules of the standard HDLC protocol. Another standard HDLC protocol condition is that switch 100 initiate link setup by sending a SABM command and terminal 101 initiate link setup by sending a unsolicited DM response.

Another condition is that a station ignore I,P commands and RR,F responses received with an erroneous receive sequence number N(R). As will be discussed later, this condition eventually leads to a link reset. Such an N(R) error does not arise from faulty transmission but from either switch 801 or terminal 802 having gone "insane" (i.e., a system software malfunction). This type of error must be corrected by a higher level of the protocol, not discussed herein, which causes the link to reset before resuming transmission.

According to the invention a station ignores I,P frames with an erroneous send sequence number N(S), and sends a RR,F acknowledging the last correctly received I,P frame (i.e., with the N(R) of the previous RR,F response). By comparison, the standard HDLC protocol provided either no response or an optional rejection (REJ) response to an I frame with an erroneous send sequence number N(S).

If the erroneous N(S) value is one less than the value expected, the error is due to faulty transmission and the disclosed protocol subset produces immediate recovery. As we have already noted, only one unacknowledged I frame is to be transmitted by a station. Any other N(S) error arises only from a transmitting station having gone "insane". In such a case the RR,F returned to the transmitting station is treated as a received sequence number error, causing this station to eventually initiate link reset.

In a preferred embodiment, faster response to a N(S) error may be obtained in the following way. If the erroneous N(S) were exactly one less than the value expected, then return RR,F as recommended. For any other N(S) error, have the station initiate link setup immediately (via SABM or DM), since this would eventually occur anyway. Either station could implement this improved strategy without the other station being aware of the fact.

As noted, terminal 101 and switch 100 each have only three states, namely a link setup state, an information transfer state, and a station busy state. By comparison to the standard HDLC protocol this is a considerable reduction from the number of states (10) which occur when each utilized the full protocol repertoire shown in FIGS. 13, 14 and 15. This reduction results from the limited repertoires of both stations. Moreover, since the disconnected state has been eliminated the detection of link failure is slower, since it now depends on some number of retransmission failures (themselves detected by timeouts).

As noted, the description of communications between switch 100 and terminal 101 using the subset protocol shown in FIG. 8 will reference the state tables of FIG. 9 and FIG. 10. To better understand these state tables of FIGS. 9 and 10, as well as FIGS. 12-15, reference is made to FIG. 18 which defines the various states. Additionally, FIG. 19 defines the notations used in the state tables of FIGS. 9, 10 and 12 through 15. The state tables of FIGS. 9 and 10 can be readily programmed into processor 114 of terminal 101 and into an associated processor of switch 100 to enable the commands/responses of the present invention control communications over the link (e.g., facility 103) connecting switch 100 with terminal 101.

With reference to FIGS. 9 and 10, we now consider the operation of the present invention by focusing in on link setup, information transfer, busy condition, recovery from transmission errors, and reactions to other error conditions.

A.1 Link Setup (state SS1 or TS1)

With reference to FIG. 10, switch 101 in response to a local start command, 1003, initiates link setup by sending SABM and then enters state SS1, 1004. When switch 101 receives a UA response, 1005, it enters (1006) the information transfer state SS2. With reference to FIG. 9, terminal 101 can also initiate a link set up in response to a local start command 903, by sending an unsolicited DM, 904, and then entering state TS1. When terminal 101 receives a SABM 905 it sends a UA, 906, and enters the information transfer state TS2. If either station (i.e., switch 100 or terminal 101) does not receive the desired response (UA or SABM, respectively) before its T1 timer expires, the link set up request is retransmitted (1007 or 907, respectively). If the station's retransmission count N2 is exceeded (913 and 1013, respectively) by unsuccessful link set up requests, a higher protocol level is called in to set up the link 914 and 1014, respectively.

A.2 Information Transfer (SS2 or TS2)

Assume that the requesting station has succeeded in establishing the information transfer states SS2 and TS2. Since stations transmit I frames with poll bit set to 1 (I,P), according to the rules of the HDLC standard, this results in the following characteristics:

i. It forces the receiving station to acknowledge the I frame, as soon as possible, with RR,F. Thus, when switch 100 receives I,P (1009) it responds with RR,F (1010). Likewise, when terminal 101 receives I,P (909), it responds with RR,F (910). In the event that a receiver station does not respond with a RR,F, the transmitting station's timer T1 expires (907 or 1007, respectively) and the same I frame is retransmitted. Furthermore, if N2 I frames are unsuccessful (913 or 1013, respectively) a signal (916 or 1016, respectively) is sent and the link set up state is established (TS1 or SS1, respectively).

ii. It automatically produces the desired window size of one, i.e., only one unacknowledged I frame, in each direction of transmission.

In the information transfer state (TS2 or SS2, respectively) a station responds to a particular signal of group 901/902 or 1001/1002 as shown in rows TS2 and SS2 of FIGS. 9 and 10, respectively.

A.3 Busy (SS3 or TS3)

When a station becomes busy (911 or 1011) the station (switch 100 or terminal 101) switches to the busy state TS3 or SS3, respectively. In this busy state the station responds to a particular signal of group 901/902 or 1001/1002 as shown in rows TS3 and SS3 of FIG. 9 and FIG. 10, respectively.

Since in the disclosed embodiment a station cannot indicate being busy, since RNR is not used, a busy station merely ignores I frames (912 and 1012) which are sent to it. The sending station keeps retransmitting its I frame (909 and 1009, respectively) and link set up will be initiated (915 and 1015, respectively) if the busy condition does not clear before the sending station's N2 is exceeded (913 and 1013, respectively).

A.4 Recovery From Transmission Errors

FIG. 11 illustrates the signal sequence to recover from transmission errors due to a corrupted I,P frame (1101) or RR,F frame (1102). Without the loss of generality we describe only switch 100 transmitting an I frame. The terminal 101 behaves in an identical manner. In FIG. 11, I1,OP is an I frame with a send sequence number $N(S)=1$ and RR2,F is the proper response. In general when an I frame IX,OP is received the proper terminal acknowledgement is $RR(X+1),F$, where $X+1$ is an integer representing the receive sequence number $N(R)$ which is one more than X the send sequence number $N(S)$.

As previously described, switch 100 retransmits any I frame for which an acknowledgement RR has not been received within time T1. Referring to the upper sequence (1101) of FIG. 11, if frame I1 itself is corrupted (1003, and hence ignored by terminal 101), then retransmission of I1 (1105) obviously results in recovery. Thus, terminal 101 would send the correct acknowledgement 1110.

If, however, the first I frame (1106) is received correctly, as in sequence 1102, but the acknowledgement (1107) is corrupted, then the retransmitted I frame 1108, has a send sequence number $(N(S)=1)$ which is one less than the value expected (2) by the terminal 802 and this is detected as a send sequence number error. To ensure recovery the retransmitted I1 frame information field (1108) is ignored by terminal 101 (since it was already received). Since an I1 frame is received, an RR2 (with correct receive sequence number) is sent by terminal 101 (1109). That is to say, the corrupted RR2 acknowledgement (1107) is repeated.

A.5 Other Error Conditions

Considering the send sequences number N(S) again, as discussed above, if an RR acknowledgement is corrupted and an I frame retransmitted, then the I frame's send sequence number is one less than the value expected by the receiver. Because of the disclosed window size (Poll bit P=1) and acknowledgement discipline, this is the only N(S) error which can occur due to transmission errors. Since, as previously noted, only one unacknowledged I frame is sent, any error in the N(S) count which is greater than one would be due to a software fault at a transmitting station (i.e., the station went "insane").

In the disclosed embodiment, when a station receives an I frame with any send sequence number, N(S), error, the station ignores the frame's information field and sends an RR, acknowledging the last correctly received I frame. When the N(S) error occurs because the N(S) value received in an I frame is one less than the N(S) value expected, then as previously described in FIG. 11, recovery takes place. However, for other N(S) errors, (e.g., station insane) the RR frame returned would not acknowledge the I frame received. In fact, the RR frame would be interpreted by its recipient station as having a receive sequence number N(R) error. We next discuss such errors and how a station is to react to them.

An erroneous receive sequence number N(R) points to an I frame which was previously transmitted and acknowledged or to an I frame which has not been transmitted and is not the next sequential I frame pending transmission. That is, the N(R) in the RR is less than or equal to the N(S) of the received I frame or is greater than N(S)+1. Since N(R) increases by one only after a station successfully receives an I frame, an erroneous N(R) cannot occur from a transmission error but only from a station going "insane". For this type of error the receiving station ignores the I frame. This causes the transmitting station to keep retransmitting the I frame, and as previously described eventually the link will be reset.

B. Switch (full set)—Terminal (subset)

The following paragraphs describe the communications in a system shown in FIG. 7, where switch (100) uses the full set and terminal (101) uses a subset of commands and responses. The state tables for the terminal and the switch are presented in FIGS. 12 and 13 to 15, respectively. Again reference is made to FIGS. 18 and 19 which define, respectively, the states, and notations used in FIGS. 12 and 13 to 15. Also, as previously noted, the state tables shown in FIGS. 12 and 13 are readily programmed into the processor of terminal 101 (i.e., processor 114) or switch 100 (processor not shown) to provide S-channel controlled controlling data transmissions between terminal 101 and switch 100 via facility 103.

FIGS. 12 through 15 will be jointly referenced in the following paragraphs. Terminal 101 has the same three states as before, but it now responds to more inputs (commands/responses) from the switch 100. Switch 100 has a larger number of states than in FIG. 10 (but still less than the 14 states required when both terminal/switch use a full set of FIG. 5). In creating the switch 100 state table, it is assumed that it operates according to the standard protocol. Inputs and responses which never occur due to the terminal's subset have been eliminated. Additionally, switch 100 window size is set to one. The reductions in states are due to the subset utilized by the terminal 101 according to the present invention and due to the fact that neither switch 100 nor terminal 101 knows if the other is busy. The switch does not know if the terminal is busy since the terminal does not send RNR. Also, although the switch sends RNR, the terminal does not keep track of the switch's busy condition.

The terminal does not have a disconnected state since it does not respond to any disconnecting command (DISC) from the switch. However, the switch has such a state which it enters after it sends a local stop command (DISC) or after it detects a "link idle" condition (15 or more successive 1s) from the terminal.

B.1 Link Setup

In a manner as previously described, and as shown in FIG. 10, switch 100 initiates link setup, state FS2, via SABM command 1501. As shown in FIG. 12, terminal 101 initiates link setup, state TS1, via an unsolicited DM response 1202. As before, if either the switch or the terminal does not receive the desired response after its T1 time expires, the request is retransmitted (1502 or 1203, respectively). As before, if the retransmission count N2 is exceeded, a higher level is called in to perform recovery (1503 or 1204, respectively).

Notice that the switch, while in the disconnected state, FS1, may transmit SABM after T1 expires. This is done to keep the link in the setup state, as much as possible, to enable the transfer of information.

B.2 Information Transfer

Terminal 101 sends all I frames to the switch 100 with the poll bit set (i.e., I,P). This enforces the terminal's window size of one and elicits an RR,F response at the switch's earliest opportunity.

Although the switch's window size is set to one, it may transmit I frames either with or without polls (see 1205 and 1206). Note, in some protocol implementations, the last I frame of a window is sent with the poll bit set. As previously noted, with a window of one, every I frame has a poll, which simplifies our protocol subset. Although this scheme is allowable, it is not required by any standard protocol. Thus the present inventive protocol subset is designed to handle I frames either with or without polls.

When terminal 101 receives an I frame with a poll (1205), it is to respond with RR,F (1207) at its earliest opportunity. When terminal 101 receives an I frame without a poll (1206), it returns RR without final (1208) at the earliest opportunity. An exception to this recommendation occurs when terminal 101 has to respond to both an I frame without poll and a supervisory frame with poll (RR,P or RNR,P). Instead of sending separate responses, the terminal sends a single RR,F which satisfies both the I frame and the supervisory frame.

B.3 Busy

When terminal 101 is busy (TS3) it does not respond with an RR to any I frame (1209 or 1210) or to an RR,P (1211) or command to an RNR,P (1212) command. When switch 100 is busy (FS8), terminal 101 (not recognizing this condition) would keep retransmitting an I frame. If the switch busy condition does not clear, these situations lead to link reset when count N2 is exceeded (1213), in a manner as previously described.

The operation of the remaining states of switch 100 are similar to those described in the preceding paragraphs and are described in the state tables of FIGS. 12 through 15.

B.4 Recovery From Transmission Errors

The guideline for transmission error recovery is to avoid link reset whenever possible. When the link is reset, one always risks either the loss of I frames or the duplicate transmission of I frames (depending on whether unacknowledged I frames are cleared or retained after link reset). Such errors require the aid of a higher level protocol for recovery.

With reference to FIGS. 16 and 17, switch 100 and terminal 101 behave differently when attempting to recover from transmission errors. We first consider recovery for a stream of I frames transmitted by switch 100 (FIG. 16), and then for I frames transmitted by the terminal 101 (FIG. 17).

B.4.1 Recovery When Switch Sends I Frames (FIG. 16)

When switch 100 does not receive an acknowledgement (RR,F) to an I frame (within T1), it may either retransmit that I frame or probe the terminal's status via RR,P or RNR,P. We now consider both of these cases.

The most direct way for the switch to attempt recovery is to retransmit the unacknowledged I frame, as shown by 1101 in FIG. 11. Although this technique is not recommended in the standard HDLC protocol, it nevertheless occurs in practice and thus the terminal should assist in this type of recovery. As shown in 1101 sequence (I frame corrupted) of FIG. 11, retransmission of the I frame produces immediate recovery. However, in 1102 sequence (RR response corrupted) of FIG. 11, retransmission results in a sent sequence number N(S) error (terminal 101 expects I2,OP but gets I1,OP instead). As previously described for FIG. 11, terminal 101 ignores the information field in an I frame with an N(S) error and sends the proper RR (with or without final, depending on the I frame) acknowledging the last correctly received I frame. (Otherwise link reset would occur). This produces recovery when the error was due purely to a transmission fault (i.e., N(S) is exactly one less than the value of N(S) expected).

With reference to FIG. 16, we describe the error recovery modes illustrated therein. First consider the case when the switch 100 attempts recovery to either a corrupted I frame, 1601, or a corrupted RR response, 1602. In both cases, as shown by 1603 and 1604, respectively, the switch probes the terminal with RR1,P (or RNR1,P if switch is busy). The terminal responds to these probes with RR1,F and RR2,F, respectively. As noted previously, the proper response to a received information frame IX,OP is an acknowledgement RR,(X+1),F where X is an integer representing the send sequence number N(S) and X+1 is the receive sequence number N(R). Since terminal 101 sent a RR1,F (1605) in response to a RR1,P (1603) in sequence 1601 switch 100 then knows that terminal 101 expects I1,OP (1606) again. By contrast when switch 100 receives RR2,F (1607) it knows that terminal 101 expects I2,OP (1608). If there is no response to the RR1,F (1605) and RR2,F (1607) probes, switch 100 would repeat them and eventually reset the link.

B.4.2 Recovery When Terminal Sends I Frames

With reference to FIG. 17, when terminal 101 does not receive acknowledgement to an I frame, it keeps retransmitting that frame until acknowledgement (RR,F) is received (or until the link is reset). In a manner similar to that described with reference to sequence 1101 of FIG. 11, if a terminal I frame were corrupted and thus ignored by the switch, retransmission would produce immediate recovery. However, for the type of error illustrated by sequence 1701 of FIG. 17, when the I frame is correctly received (1703) by the switch but the switch's RR1,F is corrupted (1704), then the retransmitted I frame (1705) is viewed by the switch as containing a send sequence number error. The switch responds to the I frame retransmission (1705) having an erroneous send sequence number by sending (in the standard HDLC manner) a REJ,F (1706) acknowledging the last I frame correctly received. The terminal according to the present invention treats a REJ1,F signal as if it were an RR1,F, using it for acknowledgement purposes. This enables the switch to continue to receive the terminal's stream of I frames.

The sequence 1702 of FIG. 17 shows what happens if the outstanding REJ1,F frame (1707) was not treated as a RR1,F by the terminal (i.e., ignored). After timeout (1708), the switch sends the command REJ1,P (1709) which the terminal ignores. After another timeout (1710) the switch probes with RR1,P (1711). Note, however, that 1702 of FIG. 17 assumes that no link reset occurred in the interim. If the terminal ignored REJ1,F then (depending on T1 and N2) after a few retransmissions the terminal may initiate link reset, before the cycle is completed. Thus, the disclosed operating mode for handing REJ,F signals at a terminal, in the same manner as RR,F signals, produces immediate recovery from transmission errors and helps prevent unnecessary link reset.

B.4.3 Other Error Conditions

We briefly consider a few more error conditions, namely (additional) send sequence N(S) errors and receive sequence N(R) errors.

Referring to previous sections A.4 and A.5 of the specification, a send sequence number N(S) error, which is not due to a transmission fault is attributable to a station going insane. When the terminal returns an RR signal, the switch perceives a receive sequence number error N(R), see 1504 of FIG. 15, and sends FRMR and enters the frame reject state FS3 of FIG. 14. However, since the terminal is designed to ignore FRMR, the switch retransmits FRMR until eventually count N2 is exceeded (1505 of FIG. 15) and a SABM is sent by the switch and the link is reset (FS2 of FIG. 15).

As discussed in prior section A.5, a receive sequence number N(R) error is due to a station going insane. The terminal is designed to ignore frames with such an error. As described previously, this will eventually cause one of the stations to initiate link reset.

B.4.4 Frames To Be Ignored

The terminal is designed to ignore certain frames (without errors). We briefly summarize these in the following paragraphs.

For simplicity, the terminal does not recognize the switch's disconnected state, nor does it allow itself to be disconnected by the switch. Thus it ignores the DM response and DISC command, respectively.

Also, for simplicity, the terminal always assumes that the switch is not busy. Thus, the terminal ignores the response RNR, with or without final. It also ignores the response RR without final, which is sent by the switch to indicate the end of a busy condition.

The terminal is designed to ignore the commands RR, REJ, and RNR when sent without polls since these do not occur in the standard's protocol. Also, for simplicity, the terminal is designed to ignore REJ,P (with poll) as well as FRMR from the switch.

Thus in summary, the frames to be ignored by the terminal are those containing commands such as DISC, RR, RNR without poll, and REJ with or without poll and those frames containing responses such as RR without final, RNR, DM, and FRMR with or without final.

While the present invention was described for use in voice and data communication system it can be utilized for data link control in any communication system utilizing the HDLC protocol in Asynchronous Balanced Mode, such as the CCITT X.25 protocol or equivalent protocols. Additionally, the present invention can be embodied in discrete components, integrated circuits or as part of a microprocessor or computer controller of a communication terminal.

What has been disclosed is merely illustrative of the present invention. Other arrangements and methods can be implemented by those skilled in the art without departing from the spirit and scope of the present invention.

What is claimed is:

1. A terminal for receiving numbered data transmissions (I) over a facility, said terminal comprising:
   means responsive to a received correctly numbered data transmission for transmitting a numbered acknowledge signal (RR) over said facility identifying said correctly numbered data transmission, and means for transmitting only said numbered acknowledge signal in response to a subsequently received incorrectly numbered data transmission.

2. The terminal of claim 1 including means responsive to a start signal for transmitting a disconnect mode signal (DM) over said facility.

3. The terminal of claim 1 further including means responsive to a received set mode signal (SABM) for transmitting an unnumbered acknowledge signal (UA) over said facility.

4. In a data communication system including a switch and terminal for communicating numbered data transmissions (I) over a facility, said switch arranged to communicate using a HDLC protocol and said terminal comprising:

means responsive to a received correctly numbered data transmission for transmitting a numbered acknowledge signal (RR) identifying said correctly numbered data transmission, and means for transmitting only said numbered acknowledge signal in response to a subsequently received incorrectly numbered data transmission.

5. The system of claim 4 wherein said terminal includes means responsive to a start signal for transmitting a disconnect mode signal (DM).

6. The system of claim 4 wherein said terminal further includes means responsive to a received set mode signal (SABM) for transmitting an unnumbered acknowledge signal (UA).

7. In a data communication system including a switch and a terminal for communicating numbered data transmissions (I) over a facility said terminal comprising:

means responsive to a received correctly numbered switch data transmission for transmitting a numbered acknowledge signal (RR) identifying said correctly numbered switch data transmission and means for transmitting only said numbered acknowledge signal in response to a subsequently received incorrectly numbered switch data transmission and said switch comprising means responsive to a received correctly numbered terminal data transmission for transmitting a numbered acknowledge signal (RR) identifying said correctly numbered terminal data transmission and means for transmitting said numbered acknowledge signal in response to a subsequently received incorrectly numbered terminal data transmission.

8. The data communication system of claim 7 wherein said terminal includes means responsive to a start signal for transmitting a disconnect mode signal (DM), and said switch includes means responsive to a link set up request signal for transmitting a set mode signal (SABM).

9. The data communication system of claim 7 wherein said terminal further includes means responsive to a received set mode signal (SABM) for transmitting an unnumbered acknowledge signal (UA).

10. A method of receiving numbered data transmission (I) over a facility, comprising the steps of:

transmitting a numbered acknowledge signal (RR) over said facility in response to and identifying a received correctly numbered data transmission received over said facility and transmitting only said numbered acknowledge signal in response to a subsequently received incorrectly numbered data transmission.

11. A method of operating a data communication system including a switch and terminal for communicating numbered data transmissions (I) over a facility, said switch arranged to communicate using a HDLC protocol, the method comprising the steps of:

transmitting from said terminal a numbered acknowledge signal (RR) over said facility in response to and identifying a received correctly numbered data transmission from said switch and transmitting from said terminal only said numbered acknowledge signal in response to a subsequently received incorrectly numbered data transmission from said switch.

12. A method of operating a data communication system including a switch and a terminal for communicating numbered data transmissions (I) over a facility, the method of operating said switch and said terminal comprising the steps of:

transmitting a numbered acknowledge signal (RR) over said facility in response to and identifying a received correctly numbered data transmission received over said facility and transmitting only said numbered acknowledge signal in response to a subsequently received incorrectly numbered data transmission.

* * * * *